United States Patent [19]

Teerling

[11] Patent Number: 4,619,799

[45] Date of Patent: Oct. 28, 1986

[54] PROCESS OF MAKING SHEET MATERIAL COMPRISING A SUBSTRATE WEB OF SYNTHETIC THERMOPLASTIC MATERIAL AND AN ADHESIVE LAYER CONSISTING OF A NON-CROSSLINKABLE ELASTOMER

[75] Inventor: Wolfgang Teerling, Tecklenburg, Fed. Rep. of Germany

[73] Assignee: Windmoller & Holscher, Lengerich, Fed. Rep. of Germany

[21] Appl. No.: 756,721

[22] Filed: Jul. 19, 1985

[30] Foreign Application Priority Data

Jul. 20, 1984 [DE] Fed. Rep. of Germany ....... 3426865
Feb. 14, 1985 [DE] Fed. Rep. of Germany ....... 3505128

[51] Int. Cl.$^4$ .................. B29C 33/10; B29C 33/18
[52] U.S. Cl. .................. 264/101; 264/102; 264/171; 264/173; 264/176.1; 264/176.2; 264/514; 425/131.1; 425/133.1; 425/190; 425/203; 425/204; 425/208; 425/370; 425/404
[58] Field of Search .............. 264/101, 102, 176 R, 264/176 F, 514, 171, 173; 425/190, 203, 404, 370, 208, 204, 131.1

[56] References Cited

U.S. PATENT DOCUMENTS

| | | | |
|---|---|---|---|
| 3,376,603 | 4/1968 | Colombo | 425/203 |
| 3,526,926 | 9/1970 | Reid | 425/190 X |
| 4,127,635 | 11/1978 | Gauthier | 264/102 |
| 4,171,193 | 10/1979 | Rahlfs | 425/404 |

FOREIGN PATENT DOCUMENTS

2527942 10/1979 Fed. Rep. of Germany .

*Primary Examiner*—Donald Czaja
*Assistant Examiner*—H. Pyon
*Attorney, Agent, or Firm*—Fleit, Jacobson, Cohn & Price

[57] ABSTRACT

In a process of making sheet material comprising a substrate web of synthetic thermoplastic material and an adhesive layer consisting of a non-crosslinkable elastomer the elastomeric material is heated above its devolatilization temperature by a feed screw of a screw extruder and is devolatilized through venting means (vent opening and vacuum pump 21) and is subsequently pressurized by a booster 7 to a pressure which is sufficient to overcome the backpressure applied by the succeeding blow head.

3 Claims, 1 Drawing Figure

PROCESS OF MAKING SHEET MATERIAL COMPRISING A SUBSTRATE WEB OF SYNTHETIC THERMOPLASTIC MATERIAL AND AN ADHESIVE LAYER CONSISTING OF A NON-CROSSLINKABLE ELASTOMER

BACKGROUND OF THE INVENTION

1. Field of the Invention

This invention relates to a process of making sheet material comprising a substrate web of synthetic thermoplastic material and an adhesive layer consisting of a non-crosslinkable elastomer.

2. Description of the Prior Art

Process of making such webs are known from Published German Application No. 25 27 942. In one of said known processes the non-crosslinkable elastomeric material is fed, heated and plasticized by means of a screw extruder and is then fed through a fitting to a slot die having a distributing passage. In the form of a flat film, a web of non-crosslinkable elastomeric is then applied to the substrate web of thermoplastic material. In another embodiment of that process, a two-layer slot die is used to make a co-extruded flat web. Another apparatus disclosed in said published application is used for a two-layer film blowing process, in which the plasticized elastomeric material for the adhesive layer and the thermoplastic material for the substrate web are supplied to a two-layer film blowing head. In all said processes the elastomeric material is processed and fed by an extruder.

It is known that variations in the output rate of extruders can be reduced by means of spinning pump type gear pumps, e.g., in the extrusion of layers of thermoplastic layers.

It is known to use devolatilizing extruders in the processing of elastomeric material. As a rule, elastomeric materials contain special components consisting of oils and other tackiness-improving additives, which when heated to elevated temperatures during the further processing are undesirably volatilized so that bubbles and holes are formed in the finished product. To prevent such volatilization, the elastomeric material is heated above its devolatilization temperature in a first part of the devolatilizing extruder and is then transferred through a grooved throttling member into a cylinder part provided with a vent opening. In that cylinder part the feed channel of the feed screw is so deep that the elastomeric material to be devolatilized can fill the channel only to one half of its depth. As a result, there is a large free surface on the screw over a length which is at least 5 times the diameter of the screw and the volatile constituents can be sucked from said free surface through the vent opening by means of an applied vacuum.

In the second part of the extruder the elastomeric material which has been devolatilized must be recompressed and subjected to a pressure which will overcome the backpressure applied by the extrusion die. This is effected in that the depth of the channel of the devolatilizing screw is reduced.

But in the extrusion of an insulating adhesive film the plastic material must be subjected to a pressure that is about ten times higher than in the processing of rubber. Such a high pressure cannot be applied unless the screw is sufficiently increased in length. In that case the elastomeric material to be compressed will be heated to such a high temperature that a second devolatilization could not be avoided.

That undesired heating could be avoided by the use of a shorter feed screw in the second part of the extruder but the backpressure applied by the extrusion die could not be overcome in that case. As a result, part of the elastomeric material to be fed would be retained and would flood the vent opening and enter the deep channels of the devolatilizing part of the feed screw. A reliable devolatilization would be prevented even if only the devolatilizing channels were entirely filled.

In the processing of a coextruded insulating sheet consisting of a polyethylene substrate web and a coextruded adhesive layer made of a non-crosslinkable elastomer, substantially butyl rubber, it has been found that the backpressure applied by the film blowing head was so high that the vent opening was flooded under all operating conditions so that a devolatilization was prevented.

SUMMARY OF THE INVENTION

The object of the invention is to provide for the making of co-extruded sheet material comprising a substrate web of synthetic thermoplastic material and an adhesive layer of a non-crosslinkable elastomer a process which ensures that the elastomer will reliably be devolatilized.

The object is accomplished in that the elastomeric material is heated above its devolatilization temperature by a feed screw of a screw extruder and is devolatilized through venting means (vent opening 20 and vacuum pump 21) and the elastomeric material is subsequently pressurized by a booster to a pressure which is sufficient to overcome the backpressure applied by the succeeding extrusion die.

Because the elastomeric material which has been devolatilized is pressurized by a booster to a pressure which is sufficient to overcome the backpressure exerted by the succeeding extrusion die, the elastomeric material will not be heated to a temperature which would result in an additional devolatilization. Besides, it is ensured thereby that the backpressure applied by the succeeding extrusion die will be overcome so that there will be no retention of the elastomeric material to be fed and said material will not flood the vent opening.

DETAILED DESCRIPTION OF THE PREFERRED EMBODIMENT

Figure 1:
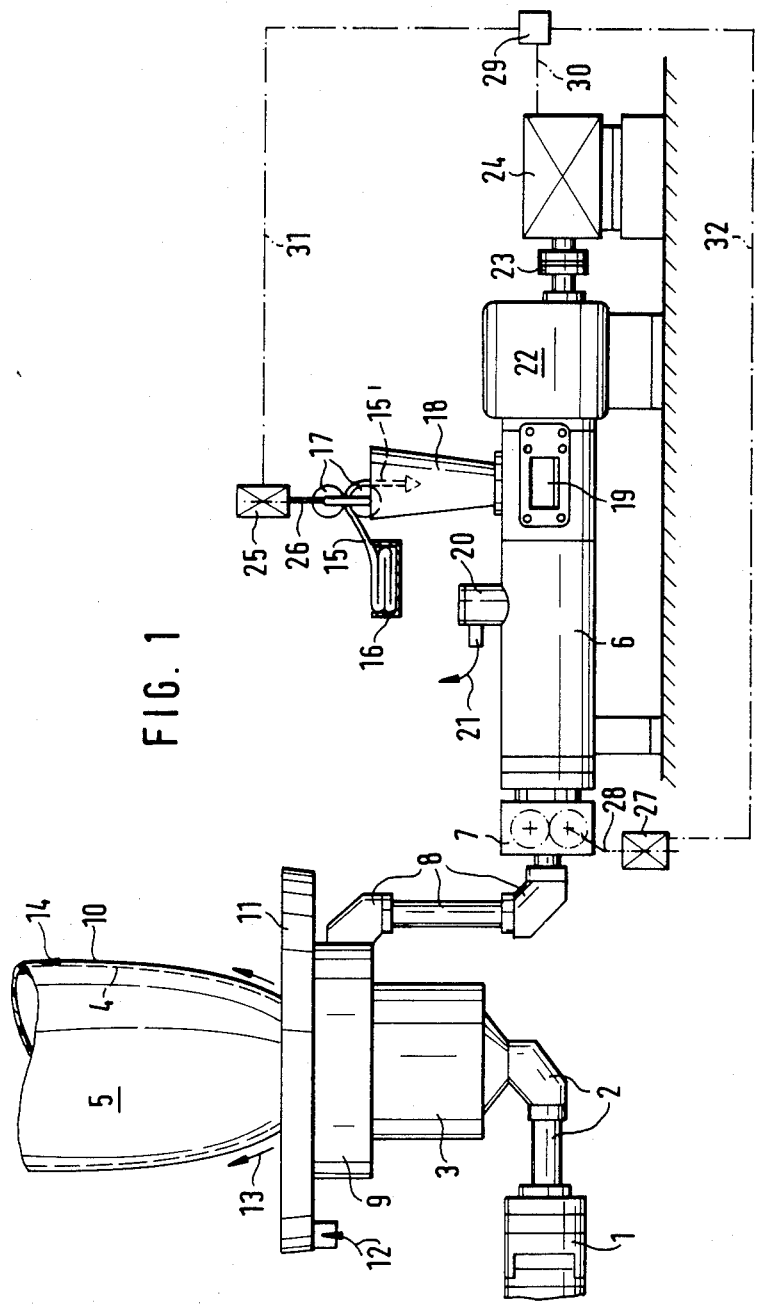
FIG. 1 is a simplified diagrammatic view showing a co-extruding blow head provided with a devolatilizing extruder comprising a spinning pump type gear pump and serving to process elastomeric materials. That extruder is shown in some more detail.

The thermoplastic substrate web is extruded by the diagrammatically indicated extruder 1, from which the molten material is supplied through the fittings 2 to the first part of the co-extruding blow head 3 and is shaped by the latter to form a tubular film 5.

The non-crosslinkable elastomeric material which is to be devolatilized is fed by the diagrammatically indicated extruder 6, which is provided with the booster 7, and through the fittings 8 is supplied to the second part of the co-extruding blow head 9 and is shaped by the latter to form the adhesive layer 10. By means of the diagrammatically indicated cooling ring 11, the co-extruded tubular film 4, 5, 10 is supplied with cooling air, which is discharged by a blower, not shown, and constitutes a concentric stream 13 of cooling air for cooling the blown tubular film. When the film has been cooled, it is collapsed, withdrawn and wound up by means 14 not shown in detail.

The non-crosslinkable elastomeric material is withdrawn, e.g., in the form of a liner strip 15 by means of the driven pair of rolls 17 from a diagrammatically indicated grid box 16 and is fed through the feed hopper 18 to the entrance opening 19. The strip of elastomeric material may be directly supplied from mixing rolls rather than from a grid box 16.

From the entrance opening 19 the elastomeric material is fed to the feed screw of the extruder 6 and is heated above its devolatilization temperature by the first part of that feed screw so that elastomeric material is devolatilized and volatile constituents are vented through the vent opening 20 connected to the diagrammatically indicated vacuum pump 21.

In accordance with the invention the elastomeric material which has been devolatilized is compacted by the second part of the feed screw of the extruder 6 to a low pressure and is subsequently pressurized by the booster 7 to the high pressure which is required to overcome the back-pressure applied by the blow head so that the co-extruded adhesive layer 10 can be formed. The booster 7 may consist, e.g., of a spinning pump type gear pump of the kind known from the processing of thermoplastic materials but may alternatively consist of another positive-displacement booster, such as a double-screw feeder.

By means of the speed reducing transmission 22 and the coupling 23, the feed screw of the extruder 6 is rotated by the constant-speed drive motor 24.

The pair of rollers 17 for withdrawing the elastomeric lining strip 15 are rotated by another constant-speed gear motor 25 by means of the diagrammatically indicated drive shaft 26.

The booster 7 is driven by a third constant-speed gear motor 27 by means of the drive shaft 28 to rotate and feed at a constant speed.

Via the cable 30, the main drive motor 24 is energized and automatically controlled to operate at a constant speed from the power supply cabinet 29. Power to gear motors 25 and 27 is supplied via lines 31 and 32, respectively, which are shown in phantom and ensure that all three drive motors will be coupled to each other at a fixed, constant ratio which can be selected as may be desired in consideration of the lining strip used and the backpressure to be overcome by the elastomeric material.

The process in accordance with the invention cannot be used only in combination with a co-extruding blow head but also in apparatus for making flat webs, which may or may not be co-extruded.

I claim:

1. A process of making sheet material comprising a substrate web of synthetic thermoplastic material and an adhesive layer of a non-crosslinkable elastomer, comprising the steps of co-extruding thermoplastic material and non-crosslinkable elastomeric material through an extrusion die to produce the sheet material, heating the elastomeric material, prior to extrusion through the extrusion die, above its devolatilization temperature by a feed screw of a screw extruder, devolatilizing the heated elastomeric material through venting means in the screw extruder, and subsequently pressurizing the devolatilized elastomeric material by a booster to a pressure which is sufficient to overcome back pressure applied by the extrusion die.

2. The process according to claim 1, wherein the booster is a positive-displacement pump.

3. The process according to claim 1, wherein the booster is a spinning pump type gear pump or a double-screw feeder.

* * * * *